FIG.I.

United States Patent Office 3,420,112
Patented Jan. 7, 1969

3,420,112
GYROSCOPIC APPARATUS
Douglas Barnett, Watford, England, assignor to S. G. Brown Limited, Watford, England, a British company
Filed Feb. 7, 1966, Ser. No. 525,410
Claims priority, application Great Britain, Feb. 8, 1965, 5,292/65
U.S. Cl. 74—5.22       12 Claims
Int. Cl. G01c 19/02

ABSTRACT OF THE DISCLOSURE

A device for detecting the angular deflection of structures such as buildings and towers is provided wherein the tank containing a multiple axis gyroscope can be mounted directly to said structure. Pick-off means present therein provide electric signals in response to misalignments of the gyroscope axes and the tank thereof due to a tilt of the structure. The signals may be used for indicating, recording, and/or control purposes. Additionally, these signals are combined with signals from transmitting pendulums to effect the precession of the gyroscope to thereby provide a vertical reference for achieving long-term stability. The pendulums are mounted on the structure so that the device will continue operation in spite of a permanent tilt of the structure. A pick-off means and a pendulum are provided for each of two perpendicular tilt planes and cross coupling errors are overcome by applying part of the signal from one pick-off means to the torquing means associated with the other. The pick-off signals can be used to control the orientation of a beam transmitted from an aerial carried by the structure.

---

The invention relates to a gyroscopic device responsive to angular deflection of tall buildings or structures such as towers or masts.

Information as to the angular deflection of tall structures as in response to wind variations, is of interest from the aspect of design particularly when the structure carries or comprises a fine-beam transmitting aerial which may be required to direct a narrow beam to a receiving aerial over a very large distance. Angular deflection of the transmitting aerial beyond certain limits would interfere with transmission. The major object of the invention is accordingly to provide a gyroscopic device affording an electric signal dependent on the angular deflection of a structure to which the device is secured. The device can incorporate or be associated with means for displaying and/or recording of the signal afforded, and the signal can be employed to control orientation of the structure, as when this comprises a transmitting aerial. The device can provide accurate information about angular deflection even in the presence of horizontal accelerations.

The invention can be embodied for example, in a detecting angular deflection of a structure, the device comprising a gyro element for securement to the structure, and pick-off means associated with the gyro element for providing a signal dependent on angular misalignment between the element and the structure due to angular deflection of the structure. To ensure stable long term operation of the gyro element, a monitoring system can be made to provide a basic vertical reference for preventing drift of the gyro from the vertical. For this purpose transmitting pendulums are used to produce a vertical reference, their output signals controlling the gyro in such a way that it never precesses from the vertical position. The intensity of control can be suited to the application and is chosen so that the time constant of this control parameter is appreciably larger than the time constant of any horizontal accelerations likely to be experienced.

Figure 1:
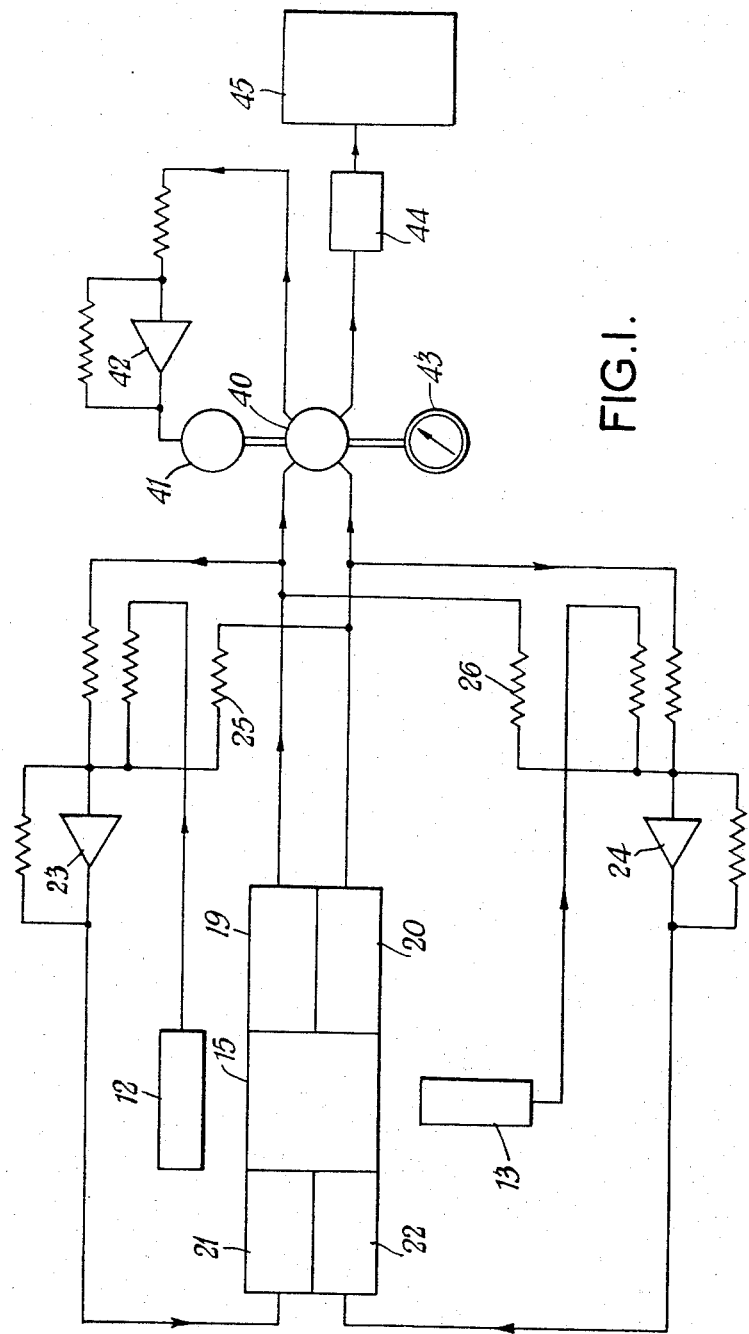
Figure 2:
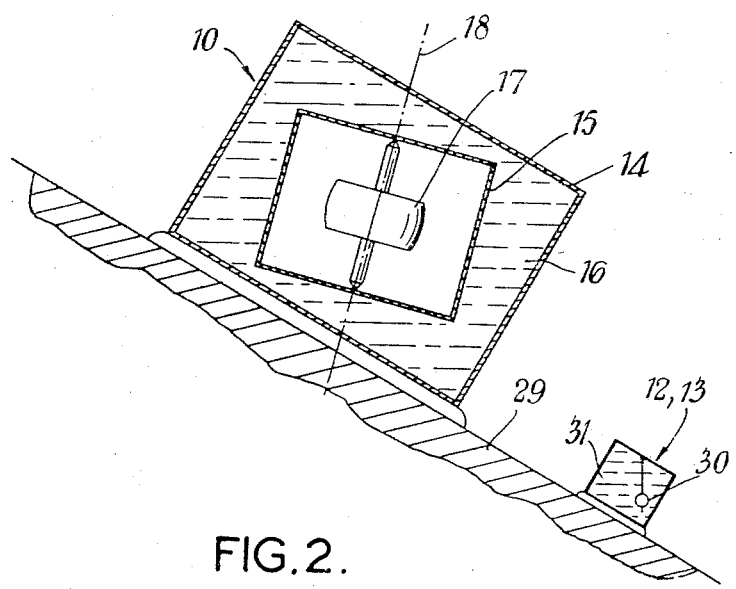
Figure 3:
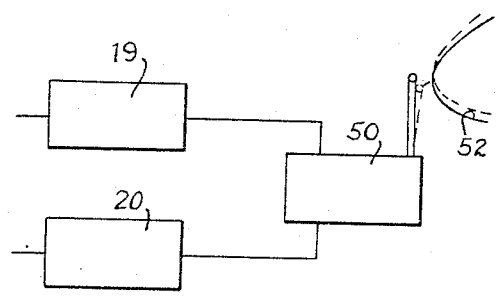

The invention can be embodied for example, in a device for measuring and recording the tilt of a structure, as described below and illustrated in the accompanying drawing, in which:

FIGURE 1 shows the device schematically;
FIGURE 2 shows the gyro unit diagrammatically; and
FIGURE 3 shows an application of the device in diagrammatic form.

The illustrated embodiment of the invention comprises a floated two axis displacement gyroscope 10 (FIGURE 2) with a vertical spin axis, and two electrically transmitting pendulums 12, 13, with measuring planes arranged at right angles.

The gyroscope 10 (FIGURE 2) comprises a generally cubical box or tank 14 in which a sensitive gyro element or ball 15 is suspended by means of a gimbal arrangement (not shown). The space between the ball 15 and the wall of the tank 14 is completely filled with a flotation fluid 16, for example, a fluorolube, in which the ball 15 floats at neutral buoyancy. Hermetically sealed within the ball 15 is a gyro wheel 17, which is mounted so as to be rotated by electrical driving means about a vertical spin axis 18.

Angular deflection or tilt of the gyro ball 15 within the tank 14 can be measured by a pair of pick-offs 19, 20 (FIGURE 1) which is arranged to provide electric signals dependent on the components of tilt about respective perpendicular axes, each nominally perpendicular to the spin axis 18 of the gyro wheel, which will be referred to as the OX and OY axes. One of these axes could be regarded as lying in the plane of FIGURE 2 and the other as being perpendicular to this plane. The pick-offs 19, 20 comprise magnet and coil assemblies (not shown in FIGURE 2) fitted in the ball and inside the tank. Besides making it possible to measure the angular rotation between the ball and the tank, these assemblies are used to apply torques to the gyro element. The pick-off means for measuring this angular rotation and the means for applying the torques (indicated by reference numerals 21, 22 in FIGURE 1 and referred to as "torques" below) are designed to operate independently and, if necessary, simultaneously about the two axes OX and OY.

It will be appreciated that the angular deflection of a structure to which the gyroscope 10 is rigidly secured will be sensed by the gyro element as the ball 15 tends to remain always fixed in space. Tilting of the tank 14 with the structure will result in angular misalignment between the tank and the gyro which will be measured by the pick-offs 19 and 20.

Each of the pendulums 12, 13 comprises a small sealed unit, as shown diagrammatically in FIGURE 2, containing a pendulum weight 30 immersed in a suitable damping fluid 31, for example, a silicone fluid selected to have the appropriate viscosity. The angular tilts of pendulums about the OX and OY axes are measured by pick-offs (not shown).

The pick-offs are excited by 400 c./s. supply derived from the basic three phase A.C. supply for driving the gyro.

The pendulums 12 and 13 provide a basic vertical reference used to control the gyroscope and prevent its spin axis from drifting from the vertical. This is necessary because any gyroscope will have uncertainty drift rate errors, due to the application of inherent uncertainty torques to the gyrowheel or appearing as apparent drift due to rotation of the earth.

As will be clear from the schematic circuit diagram of

FIGURE 1, the pick-off signal from the pendulum 12, representing tilt about the axis OX, is fed together with the signal from the pick-off 19, through an amplifier 23 to the torquer or torque motor 21 for applying torque to the gyro to precess it about the X-axis. Similarly, the pick-off signal from the pendulum 13, together with that from the pick-off 20 is fed through an amplifier 24 to the torquer 22 for applying torque to cause precession about the OY axis. To overcome cross coupling error due to the damping effect of the fluid 16 on movement of the ball 15 relative to the tank 14, small proportions of the signals from the pick-offs 19 and 20 are supplied by way of resistors 25 and 26 to the inputs of amplifiers 23 and 24 respectively.

As also indicated schematically in FIGURE 1, the signals from the pick-offs 19, 20 are used to indicate the angular deflection of the structure. In the illustrated embodiment, the X and Y tilt components, represented respectively by the A.C. signals from the pick-offs 19, 20 are combined vectorially to provide information in the form of a total tilt vector. The signals are fed to a resolver 40 driven by a gearhead servo-motor 41 receiving a null signal from the resolver by way of a servo amplifier 42. The resolver output is supplied to an indicator device 43 for visually indicating the tilt direction and a through phase-sensitive rectifier 44 to a pen recorder unit 45, for recording the magnitude of the deflections.

The components of tilt represented by the pick-off signals could of course be indicated in other ways. Each signal, for example, could be fed to a respective phase sensitive rectifier and the resulting D.C. signal used to operate a suitable recorder. The total tilt, or resultant, at any instant could then be calculated from the equation:

$$z^2 = x^2 + y^2$$

In this equation $z$ represents the resultant or total tilt and $x$ and $y$ represent respectively the tilts about the X and Y axes.

The device described can conveniently be divided into a tilt sensor or gyro unit, which is an assembly containing the gyroscope and the two pendulums, and a control and display unit which consists of a control box containing the necessary electrical gear to operate the device and the means for displaying (on chart paper or a similar medium) a record of the amount and direction of tilt. The sensor unit is of course clamped as indicated in FIGURE 2 to the portion 29 of the structure of which the tilt has to be measured but the control unit may be remote from the sensor unit, being connected to it by an electric cable.

The unit comprising the three sensors, that is, the gyroscope and the two pendulums, is conveniently enclosed in a cover or hood to provide protection from the weather. If the gyroscope and pendulums are not of the kind designed to work in an environment which is unstabilised as regards temperature, a temperature controlled environment can be provided within the cover. This is usually required for instruments of the kind described, known as flotation gyros, in which the gyroscopic element floats at neutral buoyancy in a flotation fluid; similarly, if the pendulums are damped by a viscous fluid, the pendulum time constant can be correctly maintained by stabilization of the ambient temperature.

In application of the invention to tilt stabilization of a fine beam transmitting aerial, illustrated in FIGURE 3 the A.C. signals from the pick-offs 19 and 20 are used to control the angle of shoot of the beam from the antenna. Because of the relatively slow response and rather high power requirements of a servo-mechanism 50 controlling the actual physical orientation of the antenna 52, more effective control can be obtained if the antenna is of the type used with electronic scanning. The pick-off signals can then be used to control relative phase angles of the signal supplied to the transmitting elements of the antenna array so that the transmitted beam has an effective direction of propagation independent of minor deflections of the array.

No mechanical link would then be involved, and the inherently fast response and high resolution in a device in accordance with the invention would provide for satisfactory long range V.H.F. or microwave transmission even with the aerial mounted on a rather flexible tower or mast.

A device in accordance with the invention can be designed to measure angles of tilt up to ±90 minutes of arc with an overall accuracy of ±1 minute of arc. The device will not be subject to appreciable errors in the presence of accelerations which are limited to time-constants of one or two seconds although these accelerations may correspond to an apparent tilt of as many as one hundred or even one thousand times the accuracy of measurement of deflection of which the device is capable.

As will be readily appreciated the embodiment particularly described can be modified in a variety of ways within the scope of the invention as defined by the following claims.

What is claimed is:

1. A device for detecting angular deflection of a ground supported structure, the device comprising a precision gyroscope, the gyroscope including a gyro rotor, a support for the gyro rotor adapted to be mounted on the structure, and suspension means mounting the gyro rotor on the support, said gyro rotor having limited angular freedom of movement; pick-off means associated with the gyro rotor and responsive to angular misalignments between the gyro rotor and the support thereof, due to the angular deflection of the structure, to provide a first electrical signal dependent on said misalignment; vertical reference means adapted to provide a second electrical signal; and means responsive to said first and second electrical signals for causing precession of the gyro rotor to maintain the direction of the spin axis thereof.

2. A device according to claim 1 wherein the pick-off means comprises two pick-offs each arranged to provide an electrical signal dependent on a respective component of the angular misalignment.

3. A device according to claim 2 including a casing with the gyro rotor sealed therein and wherein the support comprises a tank, a flotation fluid fills said tank, and said suspension means mounts said casing within the tank at neutral buoyancy.

4. A device according to claim 3 wherein said vertical reference means comprises two transmitting pendulums having perpendicular measuring axes corresponding to said components of the angular misalignment, and means are provided for adding to each of the signals from the pendulums a part of the signal from the pick-off acting in the other plane.

5. A device according to claim 4 wherein the transmitting pendulums are adapted to be fixed on the structure.

6. A device according to claim 2 wherein said vertical reference means includes at least two transmitting pendulums having perpendicular measuring axes corresponding to said components of the angular misalignment, and the device additionally comprising a plurality of amplifier means; means for connecting the signal from each of said pendulums means and a signal from one of said pick-offs to one of said amplifier means; and means for supplying the output of each amplifier means to the means for causing precession of the gyro element.

7. A device according to claim 6 in which each transmitting pendulum is adapted to be fixed on the structure.

8. A device according to claim 1 wherein a fine beam transmitting aerial is mounted on the structure and said means responsive to the signal from the pick-off means includes means for maintaining the orientation of the transmitted beam in spite of angular deflections of said aerial.

9. A device according to claim 8 wherein the means for maintaining the orientation of the transmitted beam comprises electronic means.

10. A device according to claim 1 additionally comprising indicia means located remotely from said gyroscope, said indicia means being connected to said pick-off means and responsive to the signals therefrom.

11. A device according to claim 2 additionally comprising means responsive to said electrical signals from each of said pick-offs for indicating the deflection; and means to combine the electrical signal vectorially to thereby provide a deflection indication in the form of a total tilt reactor.

12. A device according to claim 11 wherein said means responsive to said electrical signals for indicating the deflection includes means for visually indicating the direction of the angular misalignment; a phase sensitive rectifier in combination with a recorder for recording the magnitude of the angular misalignment; and means for supplying vectorially combined signals to said visual indicating means and to said recorder through said rectifier.

References Cited

UNITED STATES PATENTS

| | | | |
|---|---|---|---|
| 1,688,559 | 10/1928 | Sperry | 33—204.2 |
| 2,175,631 | 10/1939 | Köster | 33—204.2 |
| 2,200,196 | 5/1940 | Von Manteuffel | 74—5.8 |
| 2,273,876 | 2/1942 | Lutz et al. | 33—204.2 |
| 2,405,058 | 7/1946 | Ross | 33—204.2 |
| 2,666,199 | 1/1954 | Rothschild | 33—204.2 |
| 2,940,176 | 6/1960 | Jessup | 33—204.2 |
| 3,261,212 | 7/1966 | McMurray | 74—5.5 |
| 3,306,115 | 2/1967 | Granqvist | 74—5 |

C. J. HUSAR, *Primary Examiner.*

U.S. Cl. X.R.

74—5